UNITED STATES PATENT OFFICE.

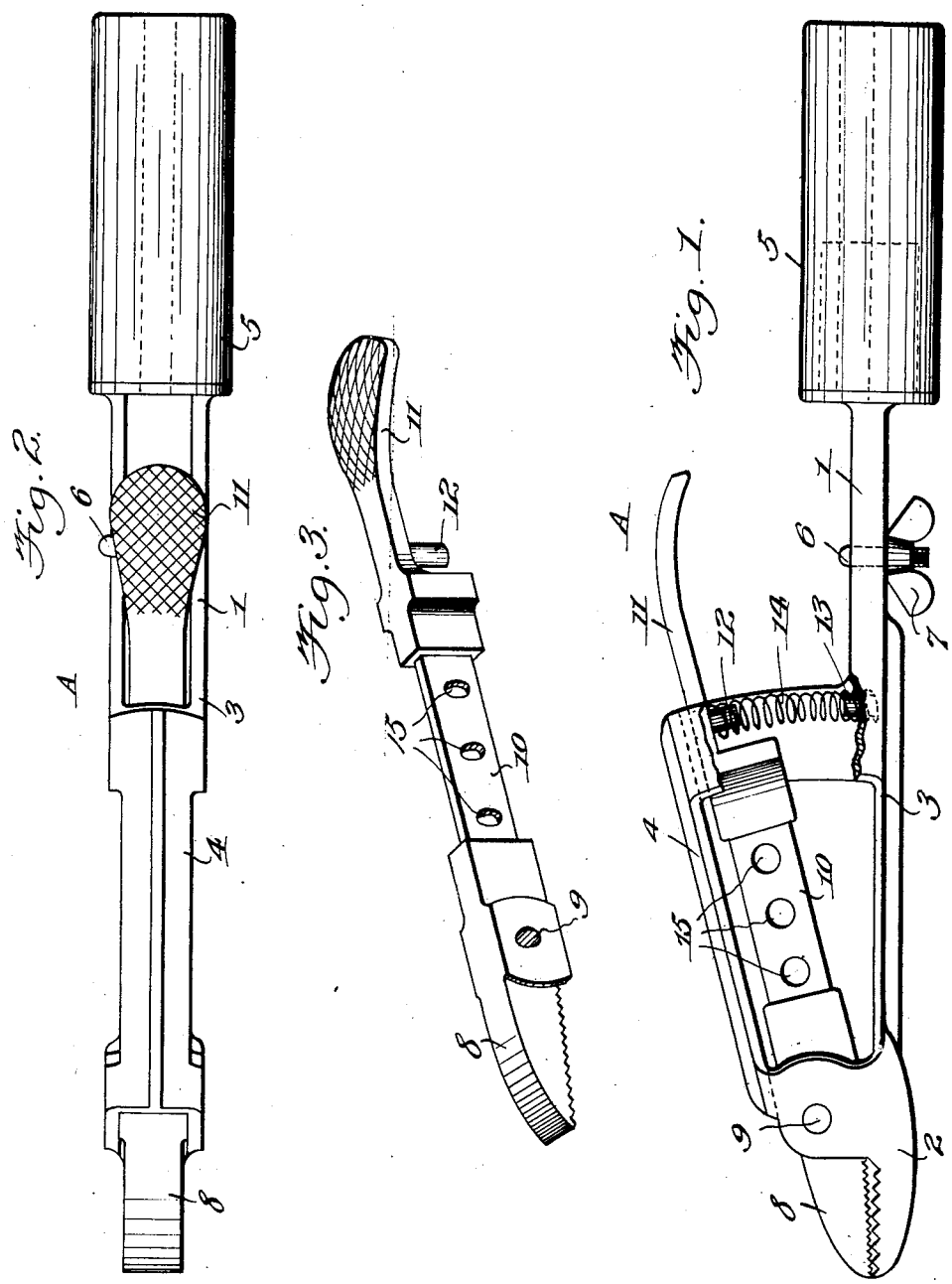

ROY O. WILLIAMS, OF COLUMBUS, OHIO.

WELDER'S TOOL.

1,301,347.  Specification of Letters Patent.  Patented Apr. 22, 1919.

Application filed February 24, 1919. Serial No. 278,656.

*To all whom it may concern:*

Be it known that I, ROY O. WILLIAMS, a citizen of the United States, residing at Columbus, in the county of Franklin and State of Ohio, have invented certain new and useful Improvements in Welders' Tools, of which the following is a specification.

This invention relates to electric or arc welding, and has particular reference to an improved tool for effecting the support and controlled manipulation of a welder's electrode, the object of the invention being to provide a tool or holder for the purpose specified which is characterized by extreme lightness in weight, with corresponding freedom of movement and adjustment, and one wherein physical injury to its user is greatly minimized, this advantage being principally effected by removing the necessity on part of the operator of fingering heated parts.

Another object of the invention resides in a tool of the aforesaid category wherein is embodied a main structure, a movable electrode clamping jaw and a handle for the jaw, the handle being constructed to offer resistance to the heat of the electrode gripping jaw, which latter owing to its proximity to the electrode of the tool will under actual working conditions become highly heated, and therefore, in order that it may be operated without offering physical injury to the tool user, said handle functions to localize the heat of the jaw and to prevent the heat from spreading to the actuating portions of said jaw.

With these and other objects in view, as will appear as the description proceeds, the invention accordingly consists in the novel features of construction, combinations of elements, and arrangement of parts, hereinafter fully described and having the scope thereof pointed out in the appended claims.

In the accompanying drawing, forming a part of this specification:

Figure 1 is a side elevation of the improved tool comprising the preferred form of the invention, Fig. 2 is a top plan view thereof, and Fig. 3 is a detailed perspective view of the movable jaw member and its associated handle.

Similar characters of reference denote like and corresponding parts throughout the several views of the drawing.

The tool A comprising the present invention is preferably used to support an electrode wire employed for arc welding purposes, so that the electrode may be brought to bear upon the work at hand and to be manipulated with requisite skill and convenience, said tool being further designed to transmit current to the electrode and to permit its operator to successfully manipulate said electrode without coming in contact with the same or to be unnecessarily exposed to its heat. To this end, the tool consists of a main structure 1 preferably formed from aluminum, so as to be light in weight and to permit the tool to be employed for extended periods without fatiguing its user. This structure 1 is formed to include a substantially stationary electrode gripping jaw 2, which terminates rearwardly in an extended, longitudinally disposed, shank portion 3 and an integral superposed frame 4. The rear end of the shank portion 3 has connected therewith a fiber gripping handle 5, by means of which the tool may be grasped and supported, and owing to the heat resisting measure of the fiber handle, the heat of the structure 1 will not be imparted to the hand of the tool user. The handle 5 is preferably hollow, and through which a current supplying conductor (not shown) may extend, the free end of this conductor being grounded upon the shank 3 by means of a hook bolt 6, friction being placed upon the wire to hold the same in electric contact with the shank 3 by means of a wing nut 7, which is threaded upon the lower end of the bolt 6 and abuts against the underside of the shank portion 3. Current thus coming into the tool will be transmitted from the conductor and by way of the shank portion 3 to the electrode supported by the jaw 2 and a coöperative movable jaw 8.

This jaw 8 is also formed from aluminum and is pivoted as at 9 to the frame 4. The pin forming this pivot is preferably constructed from cast iron and serves in a measure to insulate the heat of the jaw 8 from the surrounding portion of the frame 4. It is desirable to construct the tool A from aluminum, as the weight of the tool is thereby considerably lessened and its operator is enabled to work with greater efficiency on account of the ease by which the tool may be manipulated. However, as is well known, aluminum is an excellent conductor of heat, and therefore the present invention provides special features to prevent the heat of the tool, and particularly the jaw 8, from contacting with the operator's hand.

To this end, the rear end of the jaw 8 is preferably provided with a socket in which is inserted a cast iron or steel heat radiating strip or bar 10, and to the other end of this member 10 there is suitably secured a manipulating handle or extremity 11, by means of which the jaw 8 may be rocked about its pivot, to control its clamping relation with respect to the jaw 2. The strip 10 having both of its ends firmly embedded in both the jaw 8 and the handle 11 so that the latter will be rigidly joined to the movable jaw, whereby uniform movement on part of these related members may be effected. The handle 11 is provided along its under face with a stud 12, and a coöperating stud 13 is formed upon the shank portion 3. A coil spring 14 surrounds the studs and operates upon the handle 11 to maintain the jaw 8 in closed relation with respect to the stationary jaw 2, as will be clearly understood. The meeting of the jaws controls the upward movement on part of the handle 11, and holds the latter is spaced relation from the upper portion of the frame 4.

From the foregoing description, taken in connection with the accompanying sheet of drawing, it will be apparent that a tool of considerable utility has been supplied for the purpose set forth. The strip 10 may be perforated as at 15 to assist in the dissipation of heat imparted thereto by means of the jaw 8, and these openings are particularly efficient in cooling the strip when the tool is employed in open localities. It will be apparent that the transmission of heat from the jaw 8 to the handle 11 is effectively blocked and a handle 11 will maintain a temperature considerably below that prevailing in the jaw 8 when the tool is employed under actual working conditions.

What I claim is:

1. In an electrode holder, a main structure, a jaw member pivotally carried by said structure, and an actuating handle for said member formed to include a heat resisting portion, said latter operating to maintain the temperature of the actuating end of the handle below that of the jaw member under working conditions.

2. In an electrode holder, a main structure, a jaw member movably carried by said structure, an actuating handle for said jaw member, and a perforated strip of material rigidly positioned between said member and handle and operating to maintain the temperature of the latter below that of the jaw member.

3. In an electrode holder, a main supporting structure, a jaw pivoted in connection with said structure, an actuating element for effecting the operation of said jaw, and means disposed between said jaw and said actuating element to prevent the spread of heat from said jaw to said element.

4. An electrode holder comprising a main handle, a shank portion connected with said handle and terminating at its forward end in a stationary jaw, a movable jaw coöperative with said stationary jaw, means including a heat resisting pivot member for pivotally connecting said jaws, and a handle structure for effecting the operation of said movable jaw, said structure providing an actuating extremity capable of maintaining a lower temperature than said movable jaw under actual working conditions.

5. In a tool of the character described, a main structure, a jaw movably carried by said structure, and an actuating handle for said jaw of substantially different material than said jaw and capable of maintaining its actuating portion at a working temperature beneath that of the jaw.

6. An electrode holder comprising a main handle, a shank connected with said handle, means for clamping a current carrying conductor to said shank, a stationary jaw formed upon the forward end of said shank, a frame formed with said shank and normally disposed above the latter, a movable jaw pivotally connected to said frame and arranged for coöperation with said stationary jaw, an actuating handle of heat resisting properties for effecting the operation of said movable jaw, and spring means interposed between said shank and said movable jaw actuating handle and normally serving to maintain said jaws in abutting relation.

In testimony whereof I affix my signature.
ROY O. WILLIAMS.